United States Patent
Li et al.

(10) Patent No.: US 9,890,226 B2
(45) Date of Patent: Feb. 13, 2018

(54) HIGH MELT STRENGTH POLYPROPYLENE AND METHODS OF MAKING SAME

(71) Applicant: FINA TECHNOLOGY, INC., Houston, TX (US)

(72) Inventors: Fengkui Li, Houston, TX (US); John Ashbaugh, Houston, TX (US); David Rauscher, Longview, TX (US); Robert Dotter, Fresno, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 273 days.

(21) Appl. No.: 14/791,890

(22) Filed: Jul. 6, 2015

(65) Prior Publication Data

US 2015/0307639 A1 Oct. 29, 2015

Related U.S. Application Data

(62) Division of application No. 13/033,668, filed on Feb. 24, 2011, now abandoned.

(51) Int. Cl.
*C08F 10/06* (2006.01)
*C08J 9/00* (2006.01)
*C08L 23/26* (2006.01)

(52) U.S. Cl.
CPC ............. *C08F 10/06* (2013.01); *C08J 9/00* (2013.01); *C08L 23/26* (2013.01)

(58) Field of Classification Search
CPC ...... C08F 10/06; C08F 255/00; C08F 255/02; C08J 9/00; C08J 9/0028; C08L 23/26
See application file for complete search history.

(56) References Cited

U.S. PATENT DOCUMENTS 4,382,128 A * 5/1983 Li .................. C08F 255/00
524/513
5,344,886 A * 9/1994 Chang ............ C08F 255/02
525/260

OTHER PUBLICATIONS

Kim, K.Y. et al. Macromolecular Symposia vol. 214 pp. 289-297 (Aug. 2004).*

* cited by examiner

*Primary Examiner* — Irina S Zemel
*Assistant Examiner* — Jeffrey Lenihan
(74) *Attorney, Agent, or Firm* — Albert Shung

(57) ABSTRACT

A high melt strength polypropylene is formed using maleated polypropylene and a combination of coupling agents and acid neutralizers. The maleated polypropylene can be formed using multi-functional monomers. The high melt strength polypropylene can be useful for foaming, sheet extrusion thermoforming, extrusion blow molding, extrusion coating, fiber, film, and the like.

35 Claims, 6 Drawing Sheets

HIGH MELT STRENGTH POLYPROPYLENE AND METHODS OF MAKING SAME

CROSS-REFERENCE TO RELATED APPLICATIONS

This application is a Divisional of U.S. patent application Ser. No. 13/033,668, filed on Feb. 24, 2011, the entirety of which is incorporated herein by reference.

FIELD

The present invention generally relates to methods of making high melt strength polypropylene.

BACKGROUND

Polypropylene is a widely used plastic that has high modulus, high tensile strength, good heat resistance, and other favorable properties in the sold-state. However, due to its linear molecular architecture, polypropylene generally has relatively poor melt strength, which negatively affects its processability while in the molten state. Low melt strength limits polypropylene resins in a number of applications, such as foaming, sheet extrusion thermoforming, extrusion blow molding, extrusion coating, and the like.

The melt strength is generally increased by the addition of long-chain branches to the polymer structure. On the other hand, long chain branches bonded within the polymer structure can make the polymer too rigid, compromising the polymer's thermoplastic character. Thus, methods of making high melt strength polypropylene (HMS-PP) are needed to promote long chain branching without sacrificing the thermoplastic character.

SUMMARY

The present invention concerns methods of making high melt strength polypropylene (HMS-PP). Embodiments include methods of making HMS-PP that includes a functionalized polypropylene and some combination of coupling agents and acid neutralizers. In an embodiment, the functionalized polypropylene is maleated polypropylene, optionally formed in the presence of 0.1 to 5% by weight of a multi-functional monomer, chosen from the group containing diacrylates, triacrylates, and other acrylates. The high melt strength polypropylene can exhibit enhanced processability and performance in the molten state, as compared to neat polypropylene.

In an embodiment, the coupling reactions are achieved using a coupling agent, such as a diamine, for instance, 1,3-phenyldiamine. The coupling agent can react with maleic anhydride when maleated polypropylene is used to form the HMS-PP.

In an embodiment, the HMS-PP is formed in the presence of an acid neutralizer, and the resultant polymer is an ionomer. The acid neutralizer is generally a metal salt, such as potassium hydroxide, zinc stearate, or zinc acetate. In an embodiment a commercial ionic monomer, such as SR732, from Sartomer can be included.

In an embodiment, the HMS-PP is formed in the presence of both a coupling agent and an acid neutralizer that can synergistically be used to enhance the melt strength of the polymer product.

The HMS-PP can be useful for applications such as foaming, sheet extrusion thermoforming, extrusion blow molding, extrusion coating, fiber, film, molding, and the like.

The HMS-PP can also be used as masterbatches for enhancing the melt strength of conventional polypropylene resins.

In an embodiment, the invention is a method for forming HMS-PP that includes the steps of: reactively blending a maleated PP, a coupling agent, and an acid neutralizer, and recovering a polypropylene product of enhanced melt strength. The reactive blending is generally a reactive extrusion, performed at temperature of from 190 to 230° C. The maleated PP is desirably formed in the presence of an acrylate multi-functional monomer.

DETAILED DESCRIPTION

Figure 1A:
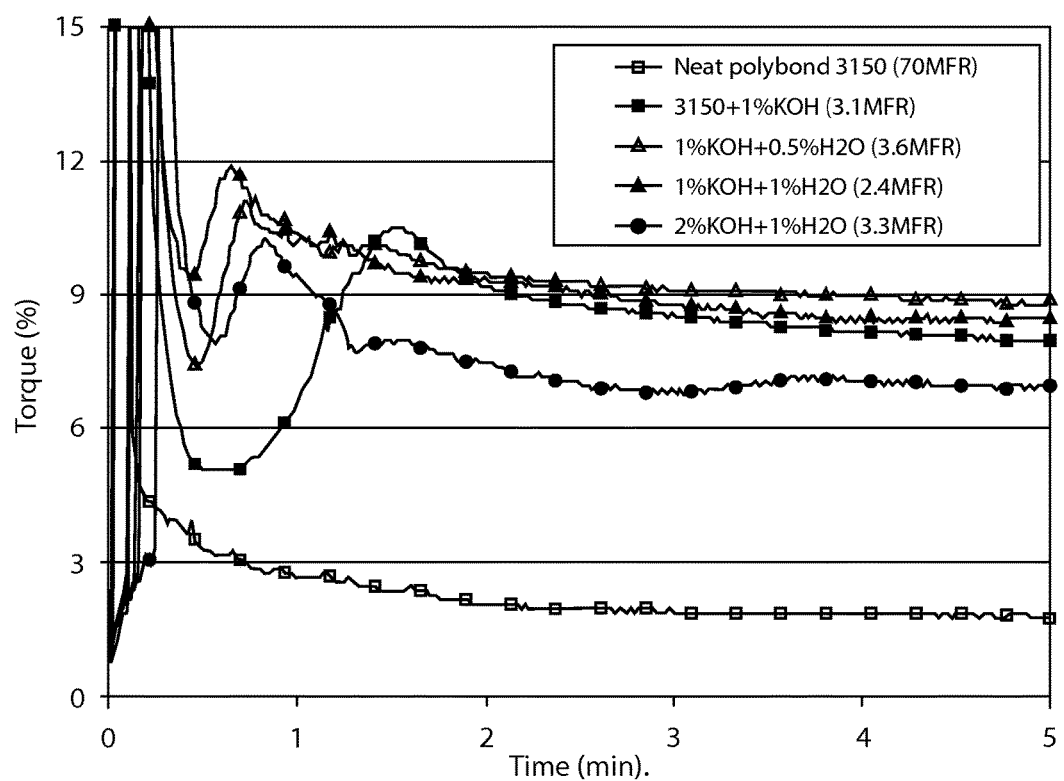
FIGS. 1a-c show torque as a function of time for polypropylene compositions containing potassium hydroxide, zinc acetate, and zinc stearate, respectively.

The present invention involves high melt strength polypropylene (HMS-PP) and methods of making it. The composition of the HMS-PP includes a functionalized polypropylene and a coupling agent, acid neutralizer, or both, the constituents of the HMS-PP varying according to different embodiments.

In all embodiments, the HMS-PP includes a functionalized polypropylene, which includes polypropylene, a free radical initiator and a graftable monomer. The polypropylene can be a homopolymer, or a copolymer containing at least 50% by weight of polypropylene and a remaining portion of a $C_2$-$C_{20}$ olefin. The polypropylene can have a crystallinity of at least 30%, and a stereoregularity of at least 60%. The polypropylene can be isotactic or syndiotactic, with a melt flow index (MFI) of from 0.1 to 100 g/10 min, optionally from 1.0 to 80 g/10 min, optionally from 5.0 to 50 g/10 min. MFI being measured according to ASTM D 1238 standard at 230° C. under a load of 2.16 kg. In embodiments of the present invention the polypropylenes can have a weight average molecular weight distribution (MWD), determined by ASTM D5296-05, ranging from 150,000 to 850,000, optionally ranging from 200,000 to 600,000, optionally ranging from 300,000 to 500,000, optionally ranging from 250,000 to 400,000, and optionally ranging from 350,000 to 400,000.

Optionally, the polypropylene can be an impact copolymer (ICP). The ICP may be one having a density range from 0.88 to 0.93 g/cm$^3$, optionally from 0.89 to 0.92 g/cm$^3$, and, optionally from 0.9 to 0.91 g/cm$^3$. In an embodiment, the ICP may have a melting point ranging from 155 to 170° C., optionally from 158 to 166° C., optionally from 160 to 165° C. ICP polypropylene may have a melt flow rate (MFR) ranging from 0.1 to 40 g/10 min. In an alternative embodiment, the ICP polypropylene may have a MFR ranging from 1 to 30 g/10 min, optionally from 3 to 20 g/10 min, optionally from 5 to 10 g/10 min. The ICPs used herein can have a weight average molecular weight distribution (MWD) ranging from 280,000 to 850,000, optionally ranging from 320,000 to 780,000, optionally ranging from 420,000 to 700,000.

The initiator is generally a peroxide, optionally an organic peroxide, and more particularly an alkyl peroxide, such as ditertiary butyl peroxide, tertiary butyl hydroperoxide, cumene hydroperoxide, p-menthane peroxide, p-menthane hydroperoxide (some might be repeats) tert-butylcumyl peroxide, 1,3-di(2-tert-butylperoxyisopropyl)benzene, 2,5-dimethyl-2,5-di(tert-butyl-peroxy)hexane, di(tert-butyl)peroxide, 2,5-dimethyl2,5-di(tert-butylperoxy)-3-hexane, and 2,5-dimethyl-2,5-di-tert-butylperoxyhexane (DHBP). The peroxide can range from 0.001 to 0.5% by weight, optionally from 0.01 to 0.3%, optionally from 0.01 to 0.1%, with respect to the polypropylene.

The graftable monomer generally contains a carbonyl, carboxylic acid or acid anhydride functional group and can be chosen from the following: acrylic acid, methacrylic acid, maleic acid, fumaric acid, itaconic acid, crotonic acid, citraconic acid, maleic anhydride, itaconic anhydride, crotonic anhydride and citraconic anhydride, maleic anhydride, and allyl methacrylate. The graftable monomer can range from 0.01 to 10% by weight, optionally from 0.1 to 10%, optionally from 1.0 to 5.0%, with respect to the polypropylene.

In an embodiment, the graftable monomer is maleic anhydride, and the functionalized polypropylene is maleated polypropylene. A commercial maleated PP can be used for the functionalized polypropylene, such as for example Polybond 3150 or Polybond 3200, commercially available from Chemtura.

In an embodiment, the functionalized polypropylene includes 0.1 to 10% by weight, optionally from 0.1 to 5%, optionally from 0.1 to 3%, of a multi-functional monomer, such as di-acrylates, triacrylates, etc. Multi-functional monomers can increase the degree of grafting. The multi-functional monomer can be an acrylate containing from 3 to 5 acrylate groups, such as trimethylolpropane triacrylate, trimethylolpropane ethoxylate triacrylate, glycerol propoxylate triacrylate, pentaerythritol triacrylate, di(trimethylolpropane)tetraacrylate, pentaerythritol tetraacrylate, pentaerythritol ethoxylate tetraacrylate, trimethylolpropane trimethacrylate, pentaerythritol ethoxylate triacrylate, and polyethylene glycol diacrylate.

In an embodiment, the functionalized polypropylene is maleated polypropylene, formed in the presence of an acrylate multi-functional monomer. Commercial maleated polypropylene resins can be used to make HMS-PP; however, the reactive extrusion of polypropylene with maleic anhydride and peroxide generally involves a significant break-up of high molecular weight chains, or vis-breaking Reducing polypropylene vis-breaking during maleated PP production can increase the number of potential long chain branches that can be formed when the HMS-PP of the invention includes coupling reactions and can be beneficial for long term performance of PP-based ionomers upon neutralization.

In an embodiment, the HMS-PP includes an acid neutralizer, and the HMS-PP is a polypropylene ionomer. A graftable monomer containing a carbonyl, carboxylic acid or acid anhydride functional group can be neutralized by metal cations. For instance, maleated polypropylene contains carboxylic acids in the polymer chain. The addition of acid neutralizers yields a polypropylene ionomer. The polar groups tend to congregate, creating crosslinks throughout the polymer chain. At high temperatures, the attraction of the polar groups is weakened. Thus, the crosslinks created by acid neutralization are reversible, and it is possible to increase the melt strength of polypropylene while retaining its thermoplastic character.

Acid neutralizers used for the present invention can be salts, optionally metallic salts. The cationic portion of the metal salt can be an alkali cation, an alkaline-earth cation, or a transition-metal cation, while the anionic portion of the metal salt can be an alcoholate, carboxylate, hydroxide, oxide, alkyl, carbonate, or hydrogen-carbonate. The acid neutralizer can be chosen from the following: sodium hydroxide, calcium oxide, sodium carbonate, sodium hydrogencarbonate, sodium methoxide, sodium acetate, magnesium ethoxide, diethylzinc, aluminium butoxide, zirconium butoxide, potassium hydroxide, zinc acetate, zinc stearate, and the like. The acid neutralizer can be potassium hydroxide, zinc acetate, or zinc stearate. The acid neutralizer can be present in an amount from 0.1 to 10% by weight, optionally from 0.1 to 7.5% by weight, optionally 0.1 to 5% by weight. Small amounts of water, such as from 0.5 to 1% by weight, can be used to expedite the neutralization reaction. Acrylate ionic monomers, such as SR 732, commercially available at Sartomer, can be added to aid the neutralization reaction in an amount from 0.1 to 5% by weight, optionally from 0.1 to 2.5% by weight, optionally from 0.5 to 1% by weight.

In another embodiment, the HMS-PP includes an amine coupling agent. The amine can be chosen from the group containing $C_4$-$C_{12}$ alkylene diamines, hexamethylene diamine (HMDA), polypropylene glycol)-bis-(2-propylamine) hexamethylenediamine, dodecamethylenediamine, and 1,3-phenylenediamine. A desirable coupling agent is 1,3-phenylenediamine. The amine can be present in an amount from 0.1 to 5% by weight, optionally from 0.1 to 2.5% by weight, optionally from 0.5 to 2% by weight.

In an embodiment, the HMS-PP includes maleated polypropylene, formed in the presence of an acrylate multi-functional monomer, a coupling agent, and an acid neutralizer. According to this embodiment, the interactions of the previously described embodiments are synergistically combined to enhance the melt strength of the polymer and increase long chain branching, without compromising its thermoplastic character.

In all embodiments, the HMS-PP can further include conventional additives such as, for example, stabilizers, antioxidants, lubricants, antistatic agents, nucleating agents, foaming agents, glass fibers or any other fillers.

In all embodiments, the components of the HMS-PP can be combined using reactive blending, such as reactive extrusion. The formation of HMS-PP can include either one or two reactive extrusions. In one embodiment, the polypropylene, free radical initiator, graftable monomer, and optionally a multi-functional monomer, are combined in a first reactive extrusion to form a functionalized polypropylene, such as maleated polypropylene. The functionalized polypropylene can then be combined with a neutralizing agent, coupling agent, or some combination thereof in a second reactive extrusion. In other embodiments, the components of the functionalized polypropylene can be combined with the neutralizing agent, coupling agent, and other additives in a single extrusion. In any case, the order of introduction of the different components into the mixers is not critical. Such a process can be performed using any extruder type, such a twin-screw extruder, the extruder can be a device that extrudes pellets as well as an extruder which produces sheet, or any other known type. The reactive extrusion can be performed at a temperature above the melting point of the polypropylene, generally from 150° to 300° C., optionally from 160° to 250° C., or optionally from 190° to 230° C.

HMS-PPs of the present invention can vary greatly in mechanical and other properties, as there many possible embodiments within the scope of the invention. Generally, the HMS-PP shows enhanced melt strength relative to neat polypropylene, as indicated by increased torque, viscosity, or melt flow rate, for example. For instance, melt flow rates of HMS-PP can be from 0.001 to 60 g/10 min, optionally from 0.01 to 35 g/10 min, or optionally from 0.1 to 8 g/10 min.

The HMS-PP can be used alone or as masterbatches, for blending with other polymer resins, such as, polypropylene homopolymers, impact copolymers, and the like.

The HMS-PP can be suitable for many applications, including all known applications of linear polypropylene. For instance, the HMS-PP can be suitable for foaming, sheet extrusion thermoforming, extrusion blow molding, extrusion coating, fiber, film, and similar applications.

In one embodiment, the invention is a method of making HMS-PP that includes reactively blending a combination a functionalized polypropylene and an acid neutralizer and recovering a polypropylene product of enhanced melt strength. The functionalized polypropylene can be a maleated polypropylene, formed in the presence of an acrylate multi-functional monomer. The acid neutralizer can be one of potassium hydroxide, zinc stearate, or zinc acetate.

In one embodiment, the invention is a method of making HMS-PP that includes reactively blending a functionalized polypropylene and an amine coupling agent and recovering a polypropylene product of enhanced melt strength. The functionalized polypropylene can be a maleated polypropylene, formed in the presence of an acrylate multi-functional monomer. The amine coupling agent can be 1,3-phenylenediamine.

In one embodiment, the invention is a method of making HMS-PP that includes reactively blending a functionalized polypropylene, an acid neutralizer, and an amine coupling agent and recovering a polypropylene product of enhanced melt strength. The functionalized polypropylene can be a maleated polypropylene, formed in the presence of an acrylate multi-functional monomer. The acid neutralizer can be one of potassium hydroxide, zinc stearate, or zinc acetate, and the amine coupling agent can be 1,3-phenylenediamine.

In an embodiment, an article can be obtained by subjecting the HMS-PP composition to a plastics shaping process such as foaming, sheet extrusion thermoforming, extrusion blow molding, extrusion coating, blow molding, injection blow molding, injection stretch blow molding, thermoforming, and the like. The polymeric composition may be formed into end use articles such as for example, packaging, office supplies, structural supports, laminate compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, medical supplies, toys, piping, and the like.

EXAMPLES

The following examples are meant to be merely illustrative of particular embodiments of the present invention, and are by no means limiting of the scope of the invention.

Example A

Several polypropylene ionomers were prepared and tested using a Haake torque rheometer to characterize their melt strengths. The ionomers were prepared via the reactive blending of maleated polypropylene and an acid neutralizer. The maleated polypropylene was Polybond 3150, commercially available from Chemtura, that has a 70 melt flow rate. The acid neutralizers used were potassium hydroxide (KOH), zinc acetate di-hydrate (ZnAc), and zinc stearate (ZnSt). Table 1 is a listing of all the prepared compositions and their melt flow rates.

TABLE 1

Ionomer compositions and resulting melt flow rates (g/10 min) used in Example A.

| Polypropylene composition | Melt flow rate (g/10 min) |
|---|---|
| Neat polybond 3150 | 70 |
| 3150 + 1% KOH | 3.1 |
| 3150 + 1% KOH + 0.5% H2O | 3.6 |
| 3150 + 1% KOH + 1% H2O | 2.4 |
| 3150 + 2% KOH + 1% H2O | 3.3 |
| 3150 + 1% ZnAc | 30 |
| 3150 + 1% ZnAc + 0.5% H2O | 17.5 |
| 3150 + 1% ZnAc + 1% H2O | 12.6 |
| 3150 + 2% ZnAc + 1% H2O | 21.2 |
| 3150 + 1% ZnSt | 54 |
| 3150 + 1% ZnSt + 0.5% H2O | 59 |
| 3150 + 1% ZnSt + 1% H2O | 53 |
| 3150 + 2% ZnSt + 1% H2O | 47 |

As indicated by Table 1, the addition of metal salt decreased the melt flow rate, which is indicative of higher melt strength. Potassium hydroxide decreased the melt flow to the greatest extent.

FIG. 1a shows torque (%) as a function of processing time for neat Polybond 3150 based ionomer compositions containing potassium hydroxide. For all polymer compositions, a spike in torque occurred in the very beginning, when the solid polymer was added to the torque rheometer. As the solids started to melt, the torque gradually decreased. Neat Polybond 3150 showed a gradual torque decrease, indicating that no reaction occurred in the material. The composition of 3150+1% KOH showed an increase in torque at about 30 seconds of mixing time, which indicates an increase in melt strength due to ionic interactions. The compositions containing small amounts of water showed torque spikes occurring sooner than that of 3150+1% KOH. Thus, addition of small amounts of water can expedite the neutralization rate.

Figure 1B:
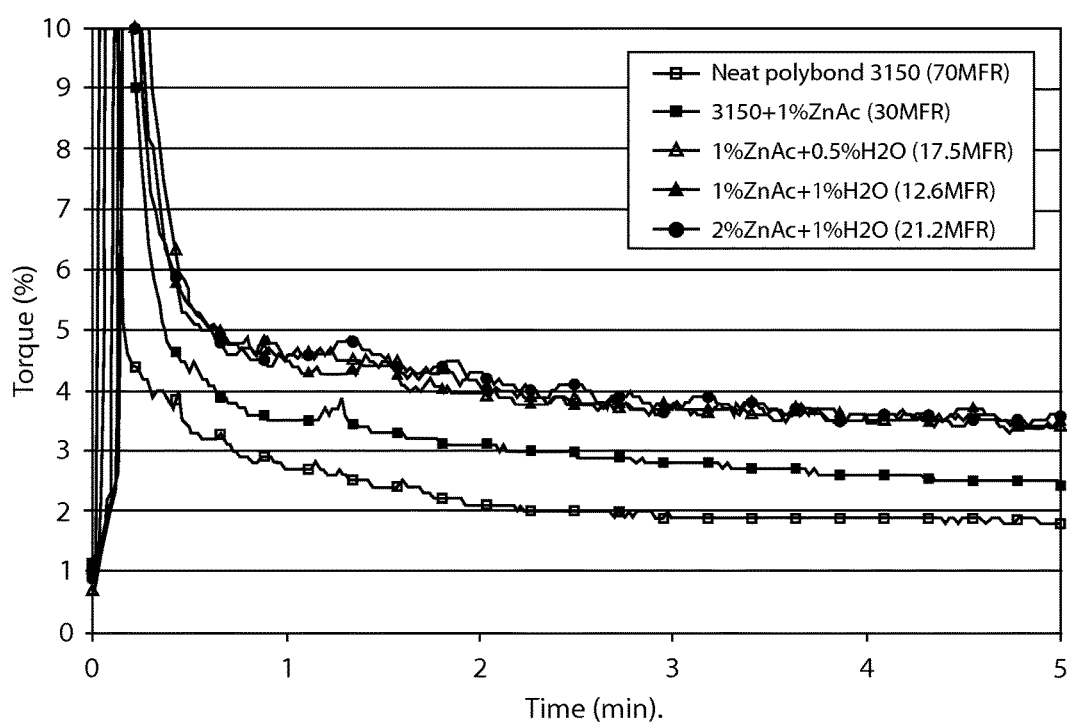
Figure 1C:
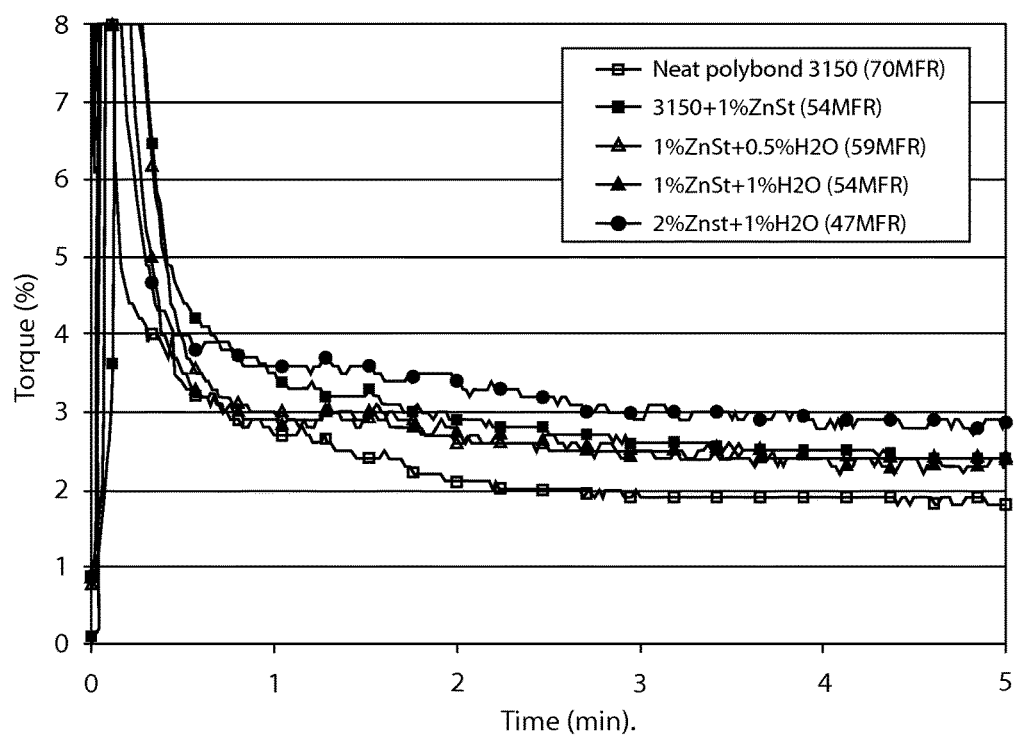

FIG. 1b shows torque (%) as a function of processing time for neat Polybond 3150 based ionomer compositions containing zinc acetate. FIG. 1c shows torque (%) as a function of processing time for neat Polybond 3150 based ionomer compositions containing zinc stearate. Both FIGS. 1b and 1c show smaller torque spikes relative to FIG. 1a. This is consistent with the melt flow rates of the potassium hydroxide ionomers being much lower than the melt flow rates of the zinc stearate and zinc acetate ionomers. Nevertheless, ionomers formed with all three metal salts showed an overall decrease in melt flow rate and an increase in torque, indicating an increase in melt strength via ionic interactions.

Example B

Several ionomers were prepared and tested for melt flow rate to characterize their melt strengths. The ionomers included maleated polypropylenes that were formed via the reactive extrusion of polypropylene, peroxide, maleic anhydride (MAH), and a multifunctional monomer. The polypropylene was Total Petrochemicals 3270, the peroxide was Lupersol-101, and the multifunctional monomer was SR259 from Sartomer.

Table 2 shows the melt flow rates of the polymer compositions. The addition of multifunctional monomer yields a maleated polypropylene with a lower melt flow, indicating vis-breaking was significantly reduced. Neutralization of the neat and maleated polypropylene compositions were performed with potassium hydroxide and zinc acetate on a 27 mm twin screw extruder. When maleated polypropylenes of different melt flow rates were blended with 3% KOH, the resulting ionomers essentially exhibited a zero melt flow rate. Lower amounts of potassium hydroxide yielded 1.2-6.5 g/10 min melt flow rates. The addition of zinc acetate resulted in ionomers with moderately lower melt flow rates. Note that the addition of zinc acetate to neat PP 3270 increased the melt flow rate. Thus, the moderate decrease of melt flow rates in the maleated PP materials was likely due to ionic interaction formation resulting from neutralization.

TABLE 2

Melt flow rates (g/10 min) of compositions from Example B.

| Sample description | Maleated PP alone | Maleated PP + 3% KOH | Maleated PP + 3% ZnAc |
|---|---|---|---|
| Neat 3270 | 2.7 | 3.1 | 3.4 |
| 3270 + 2% MAH + 0.3% L101 (no multifunctional monomer) | 50.0 | 0 | 31.8 |
| 3270 + 2% MAH + 1% SR259 + 0.3% L101 | 28.3 | 0 | 23.2 |
| 3270 + 2% MAH + 1% SR259 + 0.05% L101 | 15.6 | 0 | 12.7 |
| 3270 + 2% MAH + 1% SR259 + 0.05% L101 | 15.6 | 6.5 (1% KOH) | |
| 3270 + 2% MAH + 1% SR259 + 0.05% L101 | 15.6 | 1.2 (2% KOH) | |

Overall, the results indicate that the use of a multifunctional monomer to make maleated PP and the use of metal salts to make PP ionomers both result in lowered melt flow rates, indicating increased melt strengths.

Example C

Figure 2:
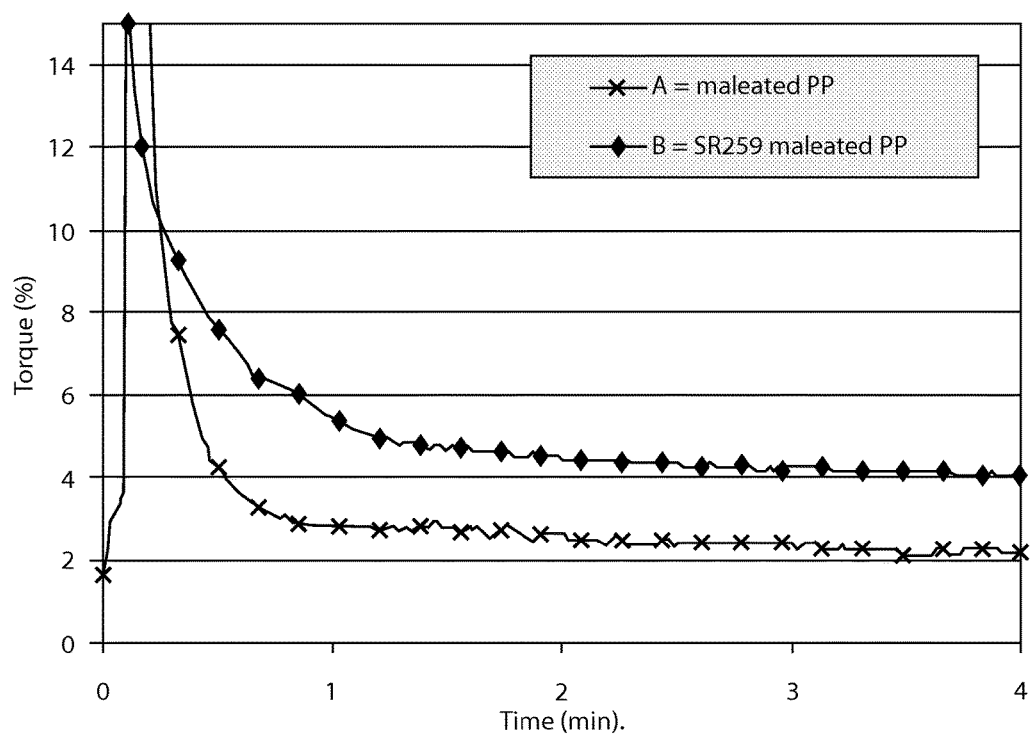
FIG. 2 shows torque as a function of time for maleated polypropylene and maleated polypropylene that was formed with a multifunctional monomer, respectively.

Several polypropylene compositions of maleated polypropylene combined with a diamine coupling agent were prepared and tested using a Haake torque rheometer to characterize their melt strengths. Two different maleated polypropylenes were prepared on a 27 mm twin screw extruder and shall be referred to as PP-A and PP-B. PP-A was the mixture of polypropylene Total Petrochemicals 3271, 2% maleic anhydride, and 0.05% Lupersol 101. PP-B included the same constituents as PP-A, plus 1% SR259, a multifunctional monomer (polyethylene glycol diacrylate) from Sartomer. FIG. 2 shows the torque of PP-A and PP-B when reprocessed on a Haake torque rheometer. PP-B shows higher torque, indicating that the use of multifunctional monomer decreased vis-breaking during maleation and that melt strength was increased.

Figure 3A:
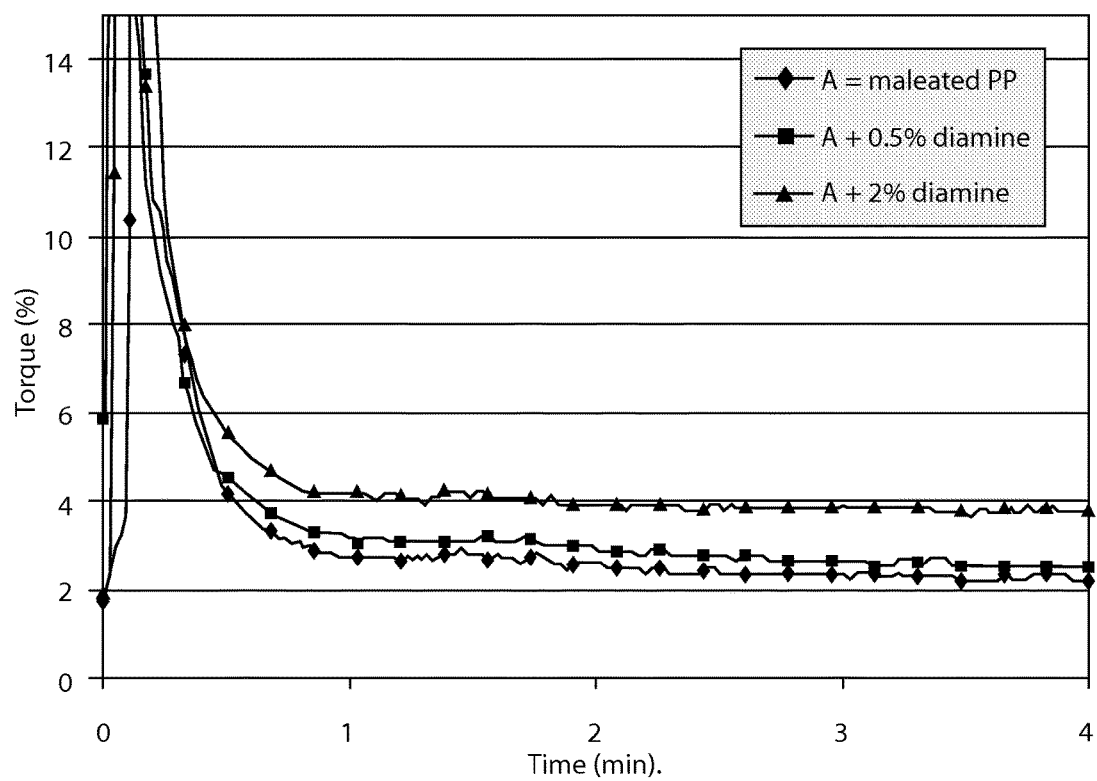
FIGS. 3a-b show torque as a function of time for amine-coupled polypropylene compositions containing maleated polypropylene and maleated polypropylene that was formed with a multifunctional monomer, respectively.
Figure 3B:
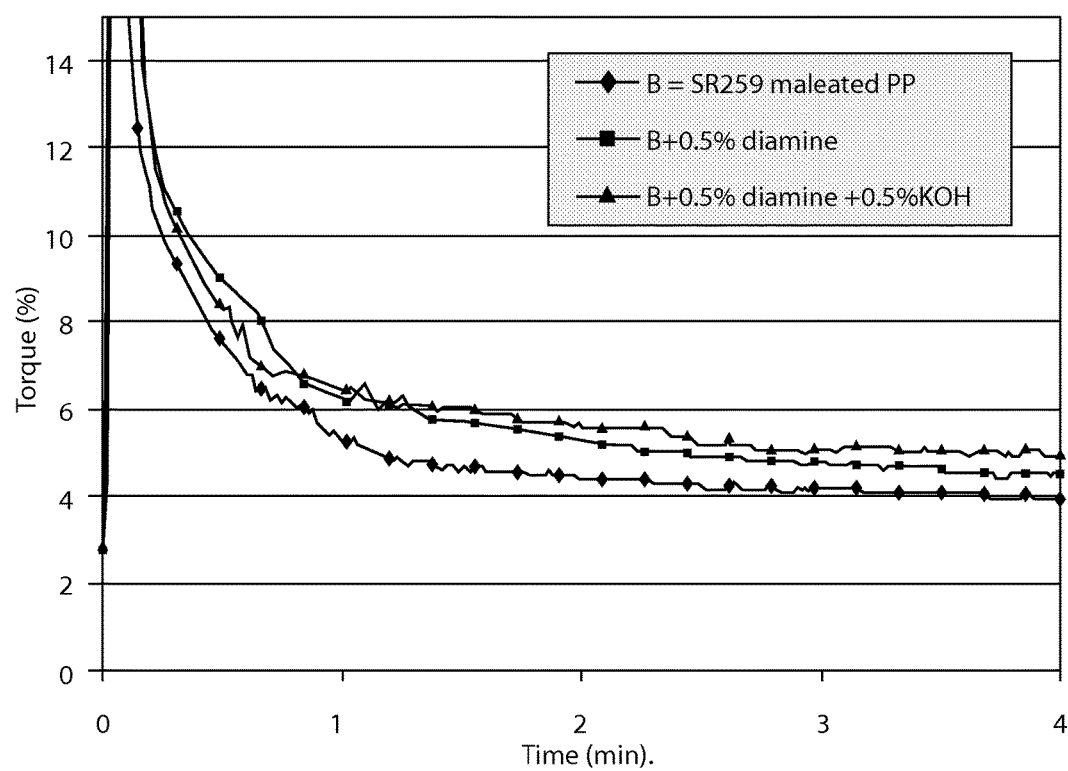

PP-A and PP-B were blended with varying amounts of 1,3-phenylenediamine (Aldrich) on a Haake type mixer at 230° C. and 60 rpm for 4 minutes to obtain long chain branching. FIG. 3a shows torque as a function of time for neat PP-A, PP-A+0.5% diamine, and PP-A+2% diamine. The addition of 0.5% diamine moderately increased torque, while 2% diamine increased torque to a further degree. Increased torque can be indicative of branching or crosslinking of maleated PP by the diamine coupling agent. FIG. 3b shows torque as a function of time for neat PP-B, PP-B+0.5% diamine, and PP-B+0.5% diamine+0.5% KOH. When maleated PP-B was mixed with 0.5% diamine, the torque increase was relatively more significant than that of PP-A+0.5% diamine, indicating more efficient branching and crosslinking of PP-B than PP-A. The use of multifunctional monomer can decrease PP vis-breaking in the maleation process and can also result in higher grafting of maleic anhydride and a more even distribution of maleic anhydride grafts. The composition of PP-B+0.5% diamine+ 0.5% KOH combined coupling reactions with ionic interactions (supplied by the neutralizer potassium hydroxide). Further increase in torque for this composition indicates that coupling reactions and ionic interactions can combine synergistically to enhance melt strength.

Example D

High melt strength polypropylenes were prepared and used as masterbatches for enhancing the melt strength of a polypropylene homopolymer and a polypropylene impact copolymer. The polymer compositions were extruded through a Brabender single-screw lab extruder and measured for sag resistance to characterize their melt strength.

The polypropylene homopolymer base resin was Total Petrochemical 3371, with a 2.8 g/10 min melt flow rate. The high melt strength polypropylenes included either multifunctional monomers or ionomers made of maleated polypropylene and neutralizers, or in one case, both. Table 3 lists the polymer compositions, shows melt flow rates (g/10 min) for the masterbatches (MB) and 3371+5% MB, and shows whether sag resistance was improved or worsened upon addition of 5% MB to 3371. Total Petrochemicals 3270 is a polypropylene homopolymer. Total Petrochemicals 4170 is a polypropylene impact copolymer. SR351 (trimethylolpropane triacrylate) and SR259 (polyethylene glycol diacrylate) are multifunctional monomers from Sartomer.

TABLE 3

Masterbatch compositions and melt flow rates and sag results when used with a polypropylene homopolymer.

| Masterbatch Composition | MFR (g/10 min) | | Sag results |
|---|---|---|---|
| | Neat MB | 3371/5% MB | |
| 3270 + 0.5% SR351 | 1.2 | 3.6 | 0 |
| 4170 + 2.0% SR259 | 1.0 | 2.9 | 0 |
| 4170 + 0.5% SR351 | 0.7 | 2.6 | 0 |
| 3270 + 3% KOH (not really an ionomer) | 3.1 | 3.2 | -- |
| 3270 + 3% ZnAc (not really an ionomer) | 3.4 | 3.4 | -- |
| 3270 + 1% MAH + 0.025% L-101 + 2% KOH | 0.0 | 3.1 | ++ |
| 3270 + 2% MAH + 0.05% L-101 + 2% KOH | 0.0 | 3.6 | +++ |
| 3270 + 1% MAH + 0.02% L-101 + 1% KOH | 0.2 | 3.2 | +++++ |
| 3270 + 1% MAH + 0.02% L-101 + 0.5% KOH | 8.3 | 3.3 | - |
| 3270 + 1% MAH + 0.02% L-101 + 0.85% KOH | 0.6 | 3.0 | ++ |
| 3270 + 2% MAH + 1% SR259 + 0.05% L101 + 2% KOH | 1.2 | 3.3 | ++ |

The polymer compositions containing multifunctional monomer did not show an improvement in sag resistance compared to neat 3371. The ionomers, however, generally improved sag resistance, and hence, improved melt strength.

The same masterbatches were also blended with a polypropylene impact copolymer, Total Petrochemicals 4170, with a fractional melt flow rate. Table 4 lists the polymer compositions, shows melt flow rates (g/10 min) for the masterbatches (MB) and 4170+5% MB, and shows whether sag resistance was improved or worsened upon addition of 5% MB to 4170.

TABLE 4

| Masterbatch Composition | MFR (g/10 min) | | Sag results |
|---|---|---|---|
| | Neat MB | 4170/5% MB | |
| 3270 + 0.5% SR351 | 1.2 | 0.88 | 0 |
| 4170 + 2.0% SR259 | 1.0 | 0.80 | 0 |
| 4170 + 0.5% SR351 | 0.7 | 0.82 | ++ |
| 3270 + 3% KOH | 3.1 | 1.01 | 0 |
| 3270 + 3% ZnAc | 3.4 | 0.96 | − |
| 3270 + 1% MAH + 0.025% L-101 + 2% KOH | 0.0 | 0.84 | 0 |
| 270 + 2% MAH + 0.05% L-101 + 2% KOH | 0.0 | 0.78 | 0 |
| 3270 + 1% MAH + 0.02% L-101 + 1% KOH | 0.2 | 0.83 | ++ |
| 3270 + 1% MAH + 0.02% L-101 + 0.5% KOH | 8.3 | 0.83 | − |
| 3270 + 1% MAH + 0.02% L-101 + 0.85% KOH | 0.6 | 0.85 | − |
| 3270 + 2% MAH + 1% SR259 + 0.05% L101 + 2% KOH | 1.2 | 0.81 | 0 |

As the base resin had a very low melt flow rate, the masterbatches containing multifunctional monomer were easier to mix with the base material, relative to mixing with 3371. As a result, the composition 4170+0.5% SR351 with a fractional melt flow rate was able to improve the melt strength of 4170. Most of the ionomers had negligible or even negative effect on 4170 melt strength, perhaps due to rubber phases in 4170 disrupting the ionic interactions. Overall, the results show that, in certain cases, high melt strength polypropylenes prepared with multifunctional monomers and/or acid neutralizers can be successfully used as masterbatches for enhancing melt strength of conventional polypropylenes.

As used herein, the term "high melt strength polypropylene" refers to a composition of polypropylene that exhibits enhanced processability and performance in the molten state, as compared to neat polypropylene. Mechanical properties of HMS-PP such as modulus, drawability, and yield strength, for example, may be higher as compared to neat polypropylene.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed:

1. A method of making a high melt strength polypropylene ionomer, comprising:
   reactively blending a combination of a functionalized polypropylene, from 0.5 to 1.0 weight percent water, from 0.5 to 10 weight percent of an acid neutralizer, and an amine coupling agent, and
   recovering a polypropylene product of enhanced melt strength.

2. The method of claim 1, wherein the functionalized polypropylene is maleated polypropylene, that is formed by the reactive extrusion of a peroxide, maleic anhydride, and 0.1 to 5% by weight of a multi-functional monomer.

3. The method of claim 2, wherein the multi-functional monomer is chosen from the group consisting of di- and tri-acrylates.

4. The method of claim 1, wherein the amine coupling agent is 1,3-phenylenediamine.

5. The method of claim 1, wherein the acid neutralizer is a metal salt.

6. The method of claim 1, wherein the acid neutralizer is chosen from the group consisting of: potassium hydroxide, zinc stearate, zinc acetate, sodium hydroxide, and combinations thereof.

7. The method of claim 1, wherein the step of reactive blending comprises reactively blending a combination of the functionalized polypropylene, the amine coupling agent, the water, the acid neutralizer and an ionic monomer.

8. A method comprising:
   reactively blending a functionalized polypropylene with an amine coupling agent, an acid neutralizer, or combinations thereof, wherein the reactively blending comprises reactively blending a combination of the functionalized polypropylene, the acid neutralizer, and from 0.5 to 1 percent by weight of water; and
   recovering a polypropylene product.

9. The method of claim 8, wherein the step of reactively blending comprises reactively blending a combination of the functionalized polypropylene and the acid neutralizer, and wherein the polypropylene product is a polypropylene ionomer.

10. The method of claim 8, wherein the functionalized polypropylene is maleated polypropylene that is formed by the reactive extrusion of a peroxide, maleic anhydride, and 0.1 to 5% by weight of a multi-functional monomer, wherein the step of reactively blending comprises reactively blending a combination of the functionalized polypropylene and the acid neutralizer, and wherein the polypropylene product is a polypropylene ionomer.

11. The method of claim 8, wherein the functionalized polypropylene is maleated polypropylene that is formed by the reactive extrusion of a polypropylene, a peroxide, and maleic anhydride, and wherein the step of reactively blending comprises reactively blending a combination of the functionalized polypropylene and the amine coupling agent.

12. The method of claim 8, wherein the functionalized polypropylene is maleated polypropylene that is formed by the reactive extrusion of a polypropylene, a peroxide, maleic anhydride, and a multi-functional monomer, and wherein the step of reactively blending comprises reactively blending a combination of the functionalized polypropylene and the amine coupling agent.

13. The method of claim 8, wherein the functionalized polypropylene is maleated polypropylene that is formed by the reactive extrusion of a polypropylene, a peroxide, maleic anhydride, and a multi-functional monomer, wherein the step of reactively blending comprises reactively blending a combination of the functionalized polypropylene, the amine coupling agent, and the acid neutralizer, and wherein the polypropylene product is a polypropylene ionomer.

14. The method of claim 8, further comprising blending the polypropylene product with a polymer resin, wherein the polypropylene product comprises a multi-functional monomer, the acid neutralizer, or both.

15. The method of claim 14, wherein the polymer resin is a polypropylene homopolymer or a polypropylene impact copolymer.

16. The method of claim 8, wherein the functionalized polypropylene is formed by reactively extruding polypropylene, a free radical initiator, and a graftable monomer.

17. The method of claim 16, wherein the polypropylene is a homopolymer, or wherein the polypropylene is a copolymer containing at least 50 percent by weight of polypropylene, wherein a remaining portion a $C_2$-$C_{20}$ olefin.

18. The method of claim 16, wherein the polypropylene has a crystallinity of at least 30% and a stereoregularity of at least 60%.

19. The method of claim 16, wherein the polypropylene is isotactic or syndiotactic, and has a melt flow index of from 0.1 to 100 g/10 min., as measured according to ASTM D 1238 at 230° C. under a load of 2.16 kg.

20. The method of claim 16, wherein the polypropylene is an impact copolymer.

21. The method of claim 20, wherein the impact copolymer has a density ranging from 0.88 to 0.93 g/cm³, a melting point ranging from 155 to 170° C., and a melt flow rate ranging from 0.1 to 40 g/10 min.

22. The method of claim 16, wherein the graftable monomer is present in an amount ranging from 0.01 to 10% by weight with respect to the polypropylene, and contains a carbonyl, carboxylic acid or acid anhydride functional group.

23. The method of claim 22, wherein the graftable monomer is acrylic acid, methacrylic acid, maleic acid, fumaric acid, itaconic acid, crotonic acid, citraconic acid, maleic anhydride, itaconic anhydride, crotonic anhydride and citraconic anhydride, maleic anhydride, or allyl methacrylate.

24. The method of claim 8, wherein the functionalized polypropylene is reactively blended with the acid neutralizer, wherein the acid neutralizer is a metal salt, wherein a cationic portion of the metal salt is an alkali cation, an alkaline-earth cation, or a transition-metal cation, wherein an anionic portion of the metal salt is an alcoholate, carboxylate, hydroxide, oxide, alkyl, carbonate, or hydrogencarbonate, and wherein the polypropylene product is a polypropylene ionomer.

25. The method of claim 24, wherein the acid neutralizer is sodium hydroxide, calcium oxide, sodium carbonate, sodium hydrogencarbonate, sodium methoxide, sodium acetate, magnesium ethoxide, diethylzinc, aluminum butoxide, zirconium butoxide, potassium hydroxide, zinc acetate, or zinc stearate.

26. The method of claim 8, wherein the amine coupling agent is present in an amount ranging from 0.1 to 5 weight percent.

27. The method of claim 26, wherein the amine coupling agent is a $C_4$-$C_{12}$ alkylene diamine.

28. The method of claim 26, wherein the amine coupling agent is hexamethylene diamine (HMDA), polypropylene glycol)-bis-(2-propylamine), dodecamethylenediamine, or 1,3-phenylenediamine.

29. The method of claim 8, wherein the reactively blending comprises reactively extruding at a temperature of from 150 to 300° C.

30. The method of claim 8, wherein the polypropylene product has a melt flow rate of from 0.001 to 60 g/10 min.

31. The method of claim 8, further comprising subjecting the polypropylene product to a plastics shaping process to obtain an article, wherein the plastics shaping process is foaming, sheet extrusion thermoforming, extrusion blow molding, extrusion coating, blow molding, injection blow molding, injection stretch blow molding, or thermoforming.

32. The method of claim 8, wherein the functionalized polypropylene includes 0.1 to 10% by weight of a multi-functional monomer, wherein the multi-functional monomer is an acrylate containing from 3 to 5 acrylate groups.

33. The method of claim 32, wherein the multi-functional monomer is trimethylolpropane triacrylate, trimethylolpropane ethoxylate triacrylate, glycerol propoxylate triacrylate, pentaerythritol triacrylate, di(trimethylolpropane) tetraacrylate, pentaerythritol tetraacrylate, pentaerythritol ethoxylate tetraacrylate, trimethylolpropane trimethacrylate, pentaerythritol ethoxylate triacrylate, or polyethylene glycol diacrylate.

34. A method comprising:
reactively blending a combination of a polypropylene, a free radical initiator, a graftable monomer, an amine coupling agent, and an acid neutralizer in a single reactive extrusion, wherein the reactively blending comprises reactively blending a combination of the polypropylene, the acid neutralizer, and from 0.5 to 1 percent by weight of water; and
recovering a polypropylene ionomer.

35. A method of making a high melt strength polypropylene, comprising:
reactively blending a combination of maleated polypropylene that has been formed in the presence of an acrylate multi-functional monomer, an amine coupling agent, and an acid neutralizer, wherein the reactively blending comprises reactively blending a combination of the maleated polypropylene, the acid neutralizer, and from 0.5 to 1 percent by weight of water; and
recovering a polypropylene product of enhanced melt strength.

* * * * *